(12) United States Patent
Bieleń

(10) Patent No.: US 10,197,169 B2
(45) Date of Patent: Feb. 5, 2019

(54) DIRECTIONAL CONTROL VALVE

(71) Applicant: Hamilton Sundstrand Corporation, Charlotte, NC (US)

(72) Inventor: Michal Bieleń, Syców (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/457,073

(22) Filed: Mar. 13, 2017

(65) Prior Publication Data
US 2017/0268681 A1 Sep. 21, 2017

(30) Foreign Application Priority Data

Mar. 15, 2016 (EP) .................................. 16461508

(51) Int. Cl.
*F16K 11/07* (2006.01)
*F16K 27/04* (2006.01)

(52) U.S. Cl.
CPC .......... *F16K 11/07* (2013.01); *F16K 11/0704* (2013.01); *F16K 27/041* (2013.01)

(58) Field of Classification Search
CPC .. F16K 11/07; F16K 11/0704; F16K 11/0712; F16K 11/0716; F16K 27/04; F16K 27/041
USPC ................................................ 251/284, 285
See application file for complete search history.

(56) References Cited

U.S. PATENT DOCUMENTS

| 3,885,583 | A | * | 5/1975 | Tennis | ................ F15B 13/0417 137/115.15 |
| 5,040,568 | A | * | 8/1991 | Hair et al. | .......... F15B 13/0402 137/625.65 |
| 5,184,643 | A | * | 2/1993 | Raymond | ............... F16K 11/07 137/625.48 |
| 5,623,968 | A | * | 4/1997 | Thorp | ................ F15B 13/0402 137/625.64 |
| 5,779,085 | A | | 7/1998 | Havlinek et al. | |

(Continued)

FOREIGN PATENT DOCUMENTS

| DE | 19916658 A1 | 10/2000 |
| DE | 102010048071 A1 | 10/2011 |

(Continued)

OTHER PUBLICATIONS

European Search Report for Application No. 16461508.0-1754; dated Sep. 9, 2016; 8 pages.

*Primary Examiner* — Kevin Lee
(74) *Attorney, Agent, or Firm* — Cantor Colburn LLP

(57) ABSTRACT

A directional control valve includes: a valve body having a bore to receive a spool; a spool mounted in said bore; at least one stopper mounted in the bore that is axially adjustable and fixable at a selected axial position. The provision of an axially adjustable stopper eliminates the need to select a suitably sized stopper from a selection of stoppers or to grind down (resize) a single stopper. It reduces the number of parts in the valve (thus reducing cost) and it also shortens the calibration time for the valve as there is no need to remove the stopper from inside the bore in order to perform an adjustment. As the valve is tested after each adjustment, this also means not removing the stopper and breaking the seal (draining the valve) between each testing phase. The calibration can therefore be performed much more efficiently.

14 Claims, 2 Drawing Sheets

(56) References Cited

U.S. PATENT DOCUMENTS

2007/0045585 A1    3/2007  Kress
2015/0300503 A1*  10/2015  Richardson et al. ... F16K 1/123
                                                    251/284

FOREIGN PATENT DOCUMENTS

GB         1357796 A    6/1974
GB         2404208 A    1/2005

* cited by examiner

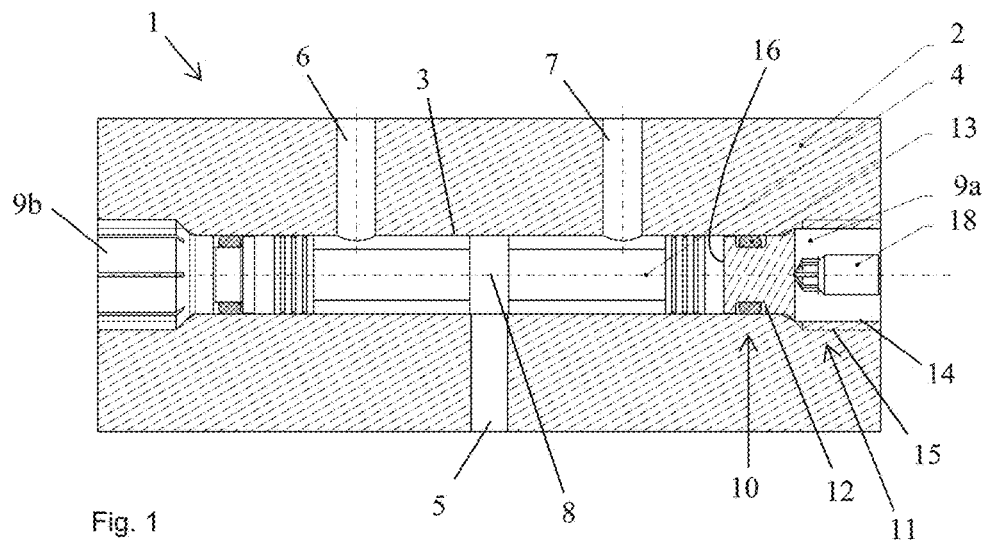
Fig. 1
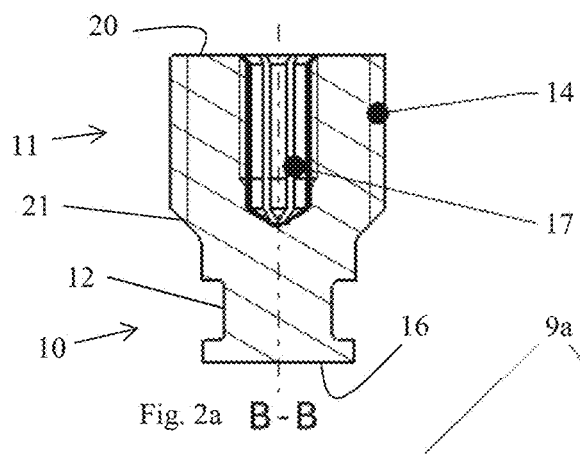
Fig. 2a  B-B
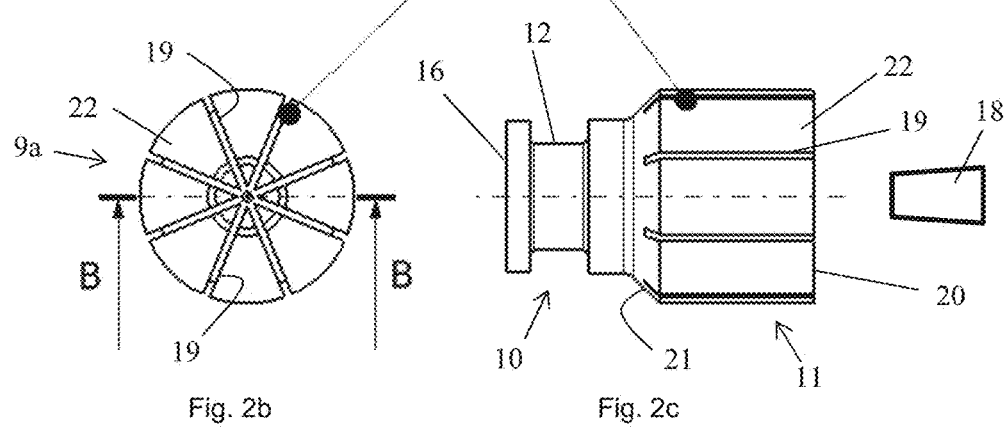
Fig. 2b    Fig. 2c

DIRECTIONAL CONTROL VALVE

FOREIGN PRIORITY

This application claims priority to European Patent Application No. 16461508.0 filed Mar. 15, 2016, the entire contents of which is incorporated herein by reference.

TECHNICAL FIELD

This disclosure relates to directional control valves, particularly spool valves (also referred to as hydraulic servo valves). Such valves are often used in aerospace applications, although they also have applications in many other fields.

BACKGROUND

A spool valve comprises a spool slidably mounted within a valve body. In operation the spool is driven between different positions within the valve body. The spool serves to connect one or more inlets with one or more outlets of the valve. The position of the spool within the valve body affects the connection(s) between inlets and outlets. For example the spool may have one or more lands that separate grooves on the spool. The lands seal against the valve body and thus prevent or restrict fluid flow past the lands. An inlet and an outlet are connected together when they both align with a single groove of the spool. Movement of the spool may cause a land to move past an inlet or outlet, thus changing the connection by moving the connecting groove out of alignment with at least one of the inlet and outlet. A land may also partially obstruct an inlet or outlet, thus restricting the fluid connection (i.e. an intermediate position between fully open and fully closed).

The spool positions for certain valve states may be defined by the limit of movement of the spool within the valve body, i.e. where the spool is driven as far as possible to one side or the other side of the valve body. These limits of motion are defined by bumpers or plugs mounted within the valve body.

For proper operation of a spool valve, the limits of motion of the spool within the valve body must be accurately defined so that the various inlets and outlets of the valve are appropriately connected in the different valve states. For example if the movement of the spool is restricted too much, it may partially block an inlet or outlet, restricting the flow through the valve. Equally, if the movement of the spool is not restricted enough, the spool may overshoot and partially block an inlet or outlet, again restricting the flow through the valve.

Assembling a spool valve involves inserting a spool into a valve body and inserting two plugs or stoppers (also referred to as bumpers), one at each end of the valve body that define the limits of the spool movement within the valve body. The valve is then calibrated by adjusting the size (i.e. length) of the plugs or stoppers so as to define the limits of spool movement.

A commonly used method of spool stroke calibration of a servo valve involves machining or grinding of the bumper to the desired length. This involves measurement of the actual parts' geometry and correction of their dimensions. This may involve replacement of the stopper with one of a different length or grinding of the stopper to remove material, shortening it to a desired length. In the case of hydraulic calibration, the method involves assembling the spool and bumper(s) in the valve body, performing an examination or test of the valve and, if necessary, removing the bumper(s) together with fasteners and seals and replacing it (or them), or alternatively grinding it (or them) to size. The valve is then reassembled and the stroke test repeated. This process is complicated and significantly increases the time required for assembly of the valve.

SUMMARY

According to this disclosure there is provided a directional control valve, comprising: a valve body having a bore; a spool movably mounted in said bore; and at least one stopper being fixably attachable to said valve body at a plurality of possible axial positions.

The provision of an axially adjustable stopper that is fixable at a plurality of possible axial positions eliminates the need to select a suitably sized stopper from a selection of stoppers or to grind down (resize) a single stopper. It reduces the number of parts in the valve (thus reducing cost) and it also shortens the calibration time for the valve as there is no need to remove the stopper from inside the bore in order to perform an adjustment. As the valve is tested after each adjustment, this also means not removing the stopper and breaking the seal (draining the valve) between each testing phase. The calibration can therefore be performed much more efficiently.

The stopper may be fixable to the valve body in any suitable way. For example it could simply be a friction fit with sufficient friction to prevent further movement or it could be by the use of clips, pins or pegs that extend across the boundary between valve body and stopper. The use of such clips, pins or pegs would provide discrete adjustment steps. However it is preferred to provide for continuous axial adjustment where possible. In other words the control valve may be configured such that the axial position of the at least one stopper relative to the valve body is continuously variable prior to being fixedly attached to the valve body. The bore may be a threaded bore and the stopper may be a threaded stopper. For example the bore may be internally threaded and the stopper externally threaded so as to provide threaded engagement. This allows for a continuous range of axial positions and allows finer and more accurate adjustment and calibration.

Fixing the stopper at the selected axial position requires preventing further accidental movement of the stopper. This may be achieved in a permanent fashion, e.g. by applying an adhesive to the threads and causing the adhesive to set in the selected position. The adhesive may be set by a specific process such as thermosetting or radiation curing, but such processes may not be easily controllable in the confines of a valve body. The adhesive may simply be allowed to set over time such that it sets after calibration has finished but before the valve is put into operational use. However, such permanent fixing does not allow for later adjustment or recalibration and therefore preferably a non-permanent fixing method is used. For example an expansion pin may be used to increase friction. The stopper may comprise a bore and the stopper may comprise an expansion pin arranged within the bore such that it can cause radial expansion of the stopper to fix its axial position. The radial expansion of the stopper increases the frictional engagement of the outer surface of the stopper with the inner surface of the bore to the point where the stopper cannot move within the bore and is thus axially fixed. This arrangement has the advantage of reducing the number of parts needed to fix the stopper in place compared with prior art stopper fixing methods which often use a metal plate attached to the valve body with screws. The use of an expansion pin and a radially expandable stopper allows the fixing to be reversed if necessary, i.e. the expansion pin can be removed and the stopper can be further axially adjusted to recalibrate the valve. The stopper can be removed if required, e.g. to service the inside of the bore or the spool. In other examples, if such servicing or recalibration is not required, an adhesive may also be used as described above to permanently fix the stopper in place after calibration. In the case of a time-setting adhesive, the expansion pin firmly fixes the stopper in place while the adhesive is setting. In other examples adhesive can be used between the expansion pin and the bore of the stopper to fix the expansion pin relative to the stopper which in turn prevents further adjustment of the stopper within the valve bore. This use of adhesive between the expansion pin and the stopper may be in addition to or instead of the use of adhesive between the stopper and the valve bore.

The expansion pin may be formed from a material that is softer than that of the stopper. As the expansion pin is inserted forcefully, it will deform plastically, thus reducing the chances of the pin falling out during the lifetime of the product e.g. due to vibrations.

The stopper may comprise a tapered expansion pin arranged such that axial movement of the expansion pin within the stopper bore causes radial expansion of the stopper. The tapered expansion pin (e.g. conical or frusto-conical expansion pin) provides an increasing radially outward force as it is driven axially deeper into the stopper bore, thus increasing the friction between the stopper and the valve body. The force may be gradually increased up to the desired level to fix the stopper in place. The expansion pin and the bore may be threaded. For example the expansion pin may have an external thread and the stopper bore may have an internal thread. The threaded engagement prevents the pin from moving axially under the increased pressure produced by the insertion of the pin. It will be appreciated that in other examples the expansion pin may be held in place using alternative means such as clips or pegs, but the threaded engagement is preferred to minimise the number of parts and as it allows smooth and gradual application of force to the desired level.

The stopper may be made expandable in any suitable way. For example it could be formed to expand upon axial compression. However, in preferred examples, the stopper comprises one or more radial slots that facilitate radial expansion of the stopper. The slot(s) allow for an increase in the circumference of the stopper as the slot(s) expand. The stopper preferably comprises a plurality of radial slots, preferably three or four or more slots. Any number of slots can be used, but a greater number of slots distributes the expansion more evenly around the circumference of the stopper. A single slot may extend across the whole diameter of the stopper such that an expansion pin driven into the slot causes the two halves of the stopper either side of the slot to splay apart. A single diametrical slot may be considered as two parallel radial slots 180 degrees apart. Alternatively a greater number of radial slots may be used to divide the circumference into a greater number of expandable parts. For example three radial slots divide the circumference into three expandable parts, etc. When the stopper comprises a bore for the expansion pin, the radial slots each extend from the bore to the outer surface of the stopper. Any number of radial slots may be used, depending on the size of the stopper. For example six or eight or more radial slots may be provided.

A further advantage of the radial slots is that they provide an interface on the axially outer end of the stopper that may be engaged by a key in order to rotate the stopper, thus causing axial movement of the stopper. For example a diametrical slot extending across the whole diameter of the stopper may be driven by a standard flathead screwdriver or similar tool. Similarly four radial slots arranged at 90 degree intervals around the stopper may be driven by a standard cross-head screwdriver. Other tools may of course be used for different arrangements of slots as required.

The stopper preferably comprises a fluid seal arranged to seal against the bore of the valve body. The fluid seal could be provided on the valve body, but it is easier to install on the stopper which is then inserted into the bore of the valve body. The fluid seal may be any kind of seal such as a lip seal, but is typically an O-ring mounted in a circumferential groove on the stopper. The O-ring is typically mounted on the interior end of the stopper (i.e. towards the interior of the bore) and, in the case of a threaded stopper, is positioned inwardly of the thread. The internally threaded part of the bore may be of wider diameter than the part that seals against the fluid seal. This allows insertion of the seal with reduced risk of damage to the seal by the threads. The transition between the wider and narrower parts of the bore forms a shoulder which defines the limit of movement of the stopper and thus defines the maximum axial insertion point of the stopper. The stopper has a similar shoulder transitioning from a narrower portion where the seal is mounted to a wider externally threaded portion for engagement with the internal bore thread. At the point of maximum insertion the shoulder of the stopper abuts the shoulder of the valve body.

The internal end face of the stopper may act as a direct stop for the spool, i.e. the spool's movement is limited when it abuts the end face. Alternatively, in some spool valves a biasing member may be arranged in the bore between the stopper and the spool. The spool therefore experiences an increasing return force as it travels further from its central or neutral position. The stopper described above is equally applicable to such arrangements and the axial adjustment serves to define the preload of the biasing member. The biasing member may be a coil spring for example.

Although a directional control valve could be formed with a single-ended bore, i.e. open at one end such that only a single stopper is required to close that end, in many cases the bore in the valve body will be a through bore and will require two stoppers, one at either end. Therefore preferably the directional control valve comprises two stoppers mounted in said bore, each stopper being axially adjustable and fixable at a selected axial position. Each stopper is individually adjustable so that the spool's movement can be accurately defined in both directions. All of the preferred or optional features described above can apply equally to both stoppers.

According to a further aspect of this disclosure, there is provided a stopper for a directional control valve, said stopper comprising: an expansion portion arranged to be radially expandable so as to fix the stopper against the inside of the bore of the directional control valve.

All of the preferred and optional features of the stopper that are described above apply to this aspect of the disclosure. Thus the stopper preferably has an external thread for engagement with a bore of a valve body. The stopper preferably comprises a bore and the stopper preferably comprises an expansion pin arranged within the bore such that it can cause radial expansion of the stopper to fix its axial position. The stopper may comprise a tapered expansion pin arranged such that axial movement of the expansion pin within the stopper bore causes radial expansion of the stopper. The expansion pin and the stopper bore may be threaded. The stopper may comprise one or more radial slots or cut-outs that facilitate radial expansion of the stopper. The stopper preferably comprises a plurality of radial slots, preferably three or four or more slots. The stopper preferably comprises a fluid seal arranged to seal against the bore of the valve body. The fluid seal may comprise a sealing member installed in a circumferential groove of the stopper.

According to another aspect of this disclosure, there is provided a method of calibrating a directional control valve comprising: inserting a stopper into a bore in a valve body of the directional control valve; axially moving the stopper relative to the valve body based on test results of said directional control valve without removing the stopper from the bore; and fixing the stopper to the valve body.

The steps of axially adjusting and re-testing may be repeated until the re-testing results are satisfactory, prior to the step of fixing. These further adjustments and re-tests can be carried out swiftly and without swapping or grinding down the stopper. Preferably the stopper is not removed from the bore between testing steps. Avoiding removal of the stopper means reduced time for calibration. In particular the seal is not broken and therefore the valve is not drained of fluid in between tests. The step of fixing preferably comprises radially expanding the stopper against the inside of the bore. Indeed all of the preferred and optional features described above in relation to the stopper apply equally to this method. Likewise this calibration method may be applied to the directional control valve described above, including any of its preferred forms or optional variations.

In particular, where the method is applied to a valve with two stoppers, the inserting step comprises inserting two stoppers into the bore; and the adjusting step comprises axially adjusting one or both of said stoppers based on the results of the test.

Testing of the directional control valve may be done in any suitable manner such as for example taking flow measurements of the spool (e.g. testing flows in any or all spool positions and comparing them) or may be direct measurements of the extent of movement of the spool. The latter may be achieved easily in valves that involve a feedback wire or spring or in valves with an electronic feedback mechanism that feeds back direct information on the position of the spool within the bore of the valve body.

According to this disclosure there is provided a directional control valve, comprising: a valve body having a bore to receive a spool; a spool mounted in said bore; at least one stopper mounted in said bore, said stopper being axially adjustable and fixable at a selected axial position.

According to another aspect of this disclosure, there is provided a method of calibrating a directional control valve comprising: inserting a stopper into a bore in a valve body of the directional control valve; testing the directional control valve; axially adjusting the stopper based on the results of said test; re-testing the directional control valve; and fixing relative to the bore.

This disclosure is particularly advantageous in relation to aircraft (including fixed wing aircraft and helicopters), e.g. in relation to flight controls, actuators for flaps and slats, etc., but it will be appreciated that the teaching is more general than that and can also be applied to any other directional control valve applications.

BRIEF DESCRIPTION OF DRAWINGS

One or more non-limiting examples will now be described, by way of example only, and with reference to the accompanying figures in which:

FIG. 1 shows a cross section through a first example of a directional control valve;

FIG. 2a shows a cross section through a stopper for a directional control valve, taken along the line B-B shown in FIG. 2b;

FIG. 2b shows an end view of the stopper of FIG. 2a;

FIG. 2c shows a side view of the stopper of FIG. 2a; and

DETAILED DESCRIPTION

Figure 3:
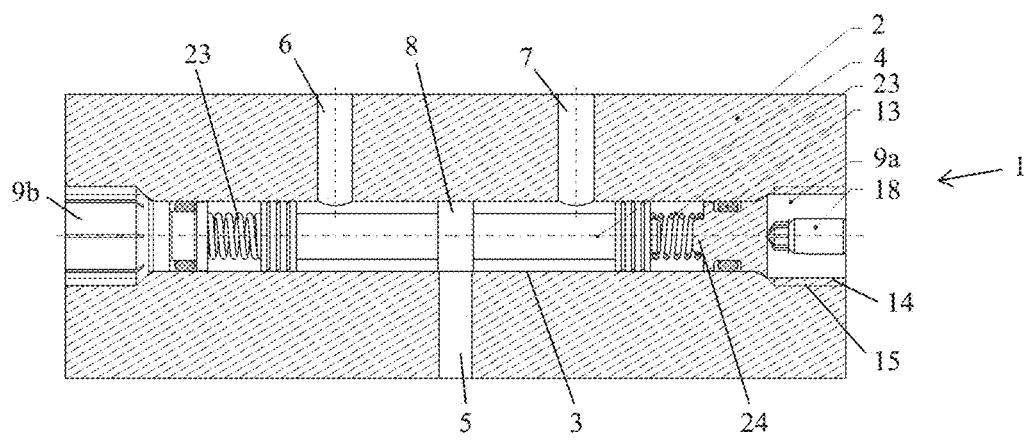
FIG. 3 shows a cross section through a second example of a directional control valve.

FIG. 1 shows a directional control valve 1 comprising a valve body 2 having a longitudinal bore 3 in which a spool 4 is inserted. The spool can shuttle back and forth within the bore 3. The spool 4 may be caused to move in any suitable way, e.g. hydraulically or electromagnetically. Depending on the position of the spool 4 within bore 3, the inlet 5 may be fluidly connected to either a first outlet 6 or a second outlet 7. If the spool 4 is to the far right of FIG. 1 the inlet 5 will be fluidly connected to first outlet 6, whereas if the spool is to the far left of FIG. 1 the inlet 5 will be connected to the outlet 7. FIG. 1 shows the spool 4 in a central, neutral position in which the inlet 5 is entirely blocked by the central seal 8 of the spool 4 and thus in this position the inlet 5 is not fluidly connected to either of the first and second outlets 6, 7.

The movement of the spool 4 within bore 3 is limited by the stoppers 9a, 9b which are inserted into the bore 3 and fixed to the valve body 2, one at either end of the bore 3. The two stoppers 9a, 9b are identical and therefore only the right hand stopper 9a will be described below.

The stopper 9a has a sealing part 10 on its innermost end (i.e. the end that is inserted most deeply into the bore 3 when the stopper 9a is in use) and an engaging part 11 on its outermost end. The sealing part 10 has a circumferential groove 12 extending around the circumference of the sealing part 10. An O-ring 13 is mounted in the groove 12 to provide a fluid tight seal against the inner surface of the valve body 2 (specifically against the wall of the bore 3).

The engaging part 11 of the stopper 9a is shown in more detail in FIGS. 2a-2c. The engaging part 11 has an external thread (e.g. a helical thread) 14 that engages with an internal thread 15 formed on the bore 3 of the valve body 2. The thread 14 of the stopper 9a engages with the thread 15 of the bore 3 so that the two parts are in threaded engagement and such that rotation of the stopper 9a relative to the valve body 2 causes axial movement of the stopper 9a within the bore 3. Thus the axial position of the stopper 9a within the bore 3 can be adjusted by rotating the stopper 9a in one or other direction. As the end face 16 of the stopper 9a defines the limit of movement of the spool 4, this axial adjustment allows for easy adjustment of the spool stroke limit without removal of the stopper 9a from the bore 3. The engaging part 11 of the stopper 9a is wider than the sealing part 10 so that the O-ring 13 mounted in groove 12 does not catch on the internal thread of the bore 3 as it is inserted, thus reducing the risk of damage to the O-ring 13 and corresponding reduced risk of failure thereof. This difference in diameters between the sealing part 10 and the engaging part 11 forms a shoulder 21 near the middle of stopper 9a.

Once both stoppers 9a, 9b have been inserted into the bore 3, to either side of the spool 4, the valve 1 is tested to see whether the limits of the spool 4 stroke are optimally defined by the stoppers 9a, 9b. This may be done by setting the spool 4 to one limit (e.g. abutting stopper 9a) and testing the flow (from inlet 5 to first outlet 6) and then setting the spool 4 to the other limit (abutting stopper 9b) and testing the flow (from inlet 5 to second outlet 7). If the spool 4 does not move far enough in one direction the inlet 5 may not fully open, thus restricting flow. If the spool 4 moves too far in one direction the outlet 6 or 7 may be partially closed, thus restricting flow. If the flow is not optimum for one particular spool position then the axial position for the appropriate stopper 9a, 9b is adjusted by rotating the stopper 9a, 9b in one or other direction so as to move the stopper 9a, 9b axially in or out. The valve 1 can then be retested and this process repeated until all spool limits are optimally set. At no point in this process is either stopper 9a, 9b removed from the bore 3 and at no point are the fluid seals formed by the O-rings 13 broken. Therefore this calibration process is fast and effective.

Once the optimum axial positions of the stoppers 9a, 9b have been determined it is desirable to fix the stoppers 9a, 9b in place within the bore 3. The fixing of stopper 9a will be described below. The stopper 9b is identical and is fixed in the same way.

As shown in FIG. 2a, the stopper 9a has an internal bore 17 formed in the engaging part 11 (i.e. the outermost end of the stopper 9a when it is inserted in the bore 3). The stopper bore 17 is an internally threaded bore which receives an externally threaded expansion pin 18 (see FIG. 2c) such that the pin 18 and bore 17 are in threaded engagement. The expansion pin 18 is tapered such that as it is inserted deeper into bore 17, it imparts an increasing radially outward force to the engaging part 11 of stopper 9a. The engaging part 11 of stopper 9a has eight radial cuts 19 formed therein (although in other examples a different number of cuts 19 can be used). Each cut 19 extends radially through the engaging part 11 from the bore 17 to the outer surface of the engaging part 11. Each cut 19 also extends axially from the outer end 20 of stopper 9a to the shoulder 21 formed between the engaging part 11 and the sealing part 10. The cuts 19 divide the engaging part 11 into multiple (eight in this case) sections 22 which splay outwardly as the expansion pin 18 is inserted into stopper bore 17. Thus each section 22 is pressed firmly against the inside of bore 3, increasing the friction therebetween and preventing further rotation of stopper 9a relative to valve body 2 (and thus preventing further axial movement of stopper 9a relative to valve body 2). Cuts 19 are best seen in FIGS. 2b and 2c. It should be noted that for clarity FIG. 2c does not show the external thread that is formed on the outer surface of the engaging part 11, nor does it show the external thread formed on the outer surface of the pin 18. The threads on the outer surface of the engaging part 11 are of course broken by the cuts 19 at regular intervals along their helical paths. The stopper 9a can be prevented from rotating while the pin 18 is rotating by a tool (not shown) engaging with the cuts 19 or other details formed on the surface of the engaging part 11 facing a direction opposite to the sealing part 10.

FIG. 3 shows a second example of a directional control valve 1. This second example is identical to the first example in most respects and identical components are indicated by the same reference numerals. the difference in the second example is that instead of the innermost end faces of stoppers 9a, 9b defining the limits of movement of the spool 4, the axial positions of stoppers 9a, 9b within bore 3 define the preload that is provided to coil springs 23 that are mounted within bore 3 between the stoppers 9a, 9b and the spool 4. The springs 23 are mounted on a small locating projection 24 on the end 16 of the stopper 9a. In FIG. 3 the right hand stopper 9a is shown in cross-section whereas the lefthand stopper 9b is shown in side view (although the remainder of the valve body 2 is shown in section). The springs 23 provide resistance to the spool 4 and thus define its axial position as a function of fluid pressure within the valve 1. Accordingly the same calibration process applies as was described above in relation to the valve 1 of FIG. 1.

Thus the stoppers 9a, 9b are in the form of a threaded plug or bumper with a sealing O-ring 13 and are screwed into the threaded opening 15 in the valve housing 2. The threads 14 of the stopper 9a, 9b, applied to the thread 15 of the bore 3 allow for smooth adjustment of the positions of the stoppers 9a, 9b without the need to disassemble the valve 1. The threaded part 14 of the stoppers 9a, 9b is radially cut and provided with a smaller coaxial threaded hole 17. After determining the optimal positions of the stoppers 9a, 9b, a tapered, threaded pin 18 is screwed into the threaded stopper's hole 17 causing the expansion of the threaded part 11 of the stopper 9a, 9b. This results in the introduction of stresses and increases the thread friction between the stopper 9a, 9b and the valve body 2, thus providing a self-locking thread. If a more permanent fixing is desired or required, the screw threads 14, 15 can be further secured together with adhesive applied to the threads 14, 15.

The invention claimed is:

1. A directional control valve, comprising:
    a valve body having a bore;
    a spool movably mounted in said bore; and
    at least one stopper being fixably attachable to said valve body at a plurality of possible axial positions;
    wherein the stopper comprises a bore and wherein the stopper comprises an expansion pin arranged within the bore such that the expansion pin can cause radial expansion of the stopper to fix its axial position.

2. The directional control valve as claimed in claim 1, wherein the control valve is configured such that axial position of the at least one stopper relative to the valve body is continuously variable prior to being fixedly attached to the valve body.

3. The directional control valve as claimed in claim 1, wherein the bore is a threaded bore and the stopper is a threaded stopper.

4. The directional control valve as claimed in claim 1, wherein the expansion pin is a tapered expansion pin arranged such that axial movement of the expansion pin within the stopper bore causes radial expansion of the stopper.

5. The directional control valve as claimed in claim 1, wherein the expansion pin and the bore are threaded.

6. The directional control valve as claimed in claim 1, wherein the expansion pin is formed from a material softer than the material of the stopper.

7. The directional control valve as claimed in claim 1, wherein the stopper comprises one or more radial slots that facilitate radial expansion of the stopper.

8. The directional control valve as claimed in claim 1, further comprising a biasing member arranged in the bore between the stopper and the spool.

9. The directional control valve as claimed in claim 1, comprising two stoppers mounted in said bore, each stopper being fixably attachable to said valve body at a plurality of possible axial positions.

10. A directional control valve stopper, said stopper comprising:
    a bore;
    an expansion portion arranged to be radially expandable so as to fix the stopper against an inside of the bore of the a directional control valve; and an expansion pin arranged within the bore such that causes radial expansion of the expansion portion.

11. A method of calibrating a directional control valve comprising:

inserting a stopper into a valve body bore in a valve body of the directional control valve, wherein the stopper comprises a bore and wherein the stopper comprises an expansion pin arranged within the bore such that it can cause radial expansion of the stopper to fix its axial position;

axially moving the stopper relative to the valve body based on test results of said directional control valve without removing the stopper from the valve body bore; and fixing the stopper to the valve body.

12. The method as claimed in claim 11, wherein the moving is continuously variable movement.

13. The method as claimed in claim 11, wherein the step of fixing comprises radially expanding the stopper against an inside of the bore.

14. The method as claimed in claim 11, wherein:

the inserting step comprises inserting two stoppers into the bore; and the moving step comprises axially moving one or both of said stoppers relative to the valve body based on test results of said directional control valve without removing either stopper from the bore.

* * * * *